US012689902B2

(12) United States Patent
Jackson et al.

(10) Patent No.: US 12,689,902 B2
(45) Date of Patent: Jul. 21, 2026

(54) AUTHENTICATION METHODS FOR A SATELLITE-BASED NAVIGATION SYSTEM, DEVICES FOR AUTHENTICATING MESSAGES AND AUTHENTICATION SYSTEM

(71) Applicant: u-blox AG, Thalwil (CH)

(72) Inventors: Bruce Jackson, Reigate (GB); Davide Lenzarini, Thalwil (CH); Roderick Bryant, Thalwil (CH)

(73) Assignee: u-blox AG, Thalwil (CH)

( * ) Notice: Subject to any disclaimer, the term of this patent is extended or adjusted under 35 U.S.C. 154(b) by 715 days.

(21) Appl. No.: 18/086,022

(22) Filed: Dec. 21, 2022

(65) Prior Publication Data

US 2023/0209352 A1      Jun. 29, 2023

(30) Foreign Application Priority Data

Dec. 23, 2021    (EP) ..................................... 21217380

(51) Int. Cl.
*H04W 12/122*          (2021.01)
*H04W 12/037*          (2021.01)
*H04W 12/088*          (2021.01)

(52) U.S. Cl.
CPC ....... *H04W 12/122* (2021.01); *H04W 12/037* (2021.01); *H04W 12/088* (2021.01)

(58) Field of Classification Search
CPC ............. H04W 12/122; H04W 12/037; H04W 12/088; H04W 12/10; H04W 12/108;
(Continued)

(56) References Cited

U.S. PATENT DOCUMENTS 8,699,715  B1 *   4/2014   Juels ..................... H04L 9/3228
                                                        380/278
10,732,288 B2 *   8/2020   Syrjarinne .............. G01S 19/05
                          (Continued)

OTHER PUBLICATIONS

Extended Search Report in European Appln. No. 21217380.1, dated Jun. 27, 2022, 11 pages.
(Continued)

*Primary Examiner* — Quazi Farooqui
(74) *Attorney, Agent, or Firm* — Fish & Richardson P.C.

(57) ABSTRACT

The present disclosure provides an authentication method for a satellite-based navigation system that in some implementations includes: obtaining, by an authentication server, a plurality of message authentication bundles from a plurality of reference receiver stations, each message authentication bundle comprising at least one hash for authenticating a corresponding SNS message received by a respective reference receiver station from at least one satellite of the SNS; inserting, by the authentication server at least a subset of the hashes of the obtained message authentication bundles into a probabilistic data structure (PDS), which forms at least a part of a validation filter for authenticating a corresponding subset of SNS messages; and distributing the validation filter to at least one receiver-side device. The disclosure further provides authentication methods performed by a reference receiver station and a receiver-side device, respectively, as well as devices and systems for authenticating SNS messages.

19 Claims, 11 Drawing Sheets

(58) Field of Classification Search
    CPC .... H04W 12/106; G01S 19/20; G01S 19/215;
          G01S 19/21; H04L 63/126; H04L 63/123;
                                        H04L 63/12
    See application file for complete search history.

(56)                References Cited

U.S. PATENT DOCUMENTS

| 2012/0089481 A1* | 4/2012 | Iozzia | ...................... H04N 7/16 |
| | | | 726/5 |
| 2018/0372876 A1 | 12/2018 | Syrjarinne | |
| 2019/0120970 A1* | 4/2019 | Vigen | ................... G01S 19/215 |
| 2021/0034674 A1* | 2/2021 | Palsetia | ............... G06F 16/9017 |

OTHER PUBLICATIONS

Yang et al., "Lis: Lightweight signature schemes for continuous message authentication in cyber-physical systems," Designing Interactive Systems Conference, ACM, 2020, pp. 719-731.

* cited by examiner

| Fig. 4A |
| Fig. 4B |
| Fig. 4C |
| Fig. 4D |

| RRS ID | Message ID | Hash |
|--------|-----------|------|
| 1 | 1 | a4cx |
| 2 | 1 | a4cx |
| *1* | 2 | *25d3* |
| 2 | 2 | d34s |
| 3 | 2 | d34s |
| 1 | 3 | 33ef |
| 2 | 3 | 33ef |
| 3 | 3 | 33ef |
| 2 | 4 | 3ew4 |
| 3 | 4 | 3ew4 |
| 3 | 5 | 12sd |
| 1 | 6 | *w3r4* |
| 3 | 6 | *g5t6* |
| 4 | 6 | *w3r4* |
| 5 | 6 | *g5t6* |
| ... | ... | ... |

510

$hB(a4cx) = 1$
$hC(a4cx) = 5$

| Bucket | Entry 1 ($f$ bits) | Entry 2 ($f$ bits) |
|---|---|---|
| 1 | $fp1(a4cx) \rightarrow fd$ | $fp1(33ef) \rightarrow 4d$ |
| 2 | ... | ... |
| 3 | $fp1(2wtr) \rightarrow ad$ | $fp1(3ew4) \rightarrow ce$ |
| 4 | ... | ... |
| 5 | ... | ... |

$hB(d34s) = 1$
$hC(d34s) = 3$

520

| Index | Element ($e$ bits) |
|---|---|
| 1 | $fp2(d34s)->34s$ |
| 2 | ... |
| 3 | ... |

600

700

800

900

AUTHENTICATION METHODS FOR A SATELLITE-BASED NAVIGATION SYSTEM, DEVICES FOR AUTHENTICATING MESSAGES AND AUTHENTICATION SYSTEM

CROSS-REFERENCE TO RELATED APPLICATIONS

This application claims the benefit of priority to European Application No. 21217380.1, filed on Dec. 23, 2021, the contents of which are hereby incorporated by reference.

The present disclosure relates to authentication methods for a satellite-based navigation system. Specifically, the present disclosure relates to authentication methods performed by an authentication server, a receiver-side device and a reference receiver station for generating and using a validation filter. The present disclosure further relates to a device for authenticating messages of a satellite-based navigation system and an authentication system for a satellite-based navigation system.

A number of global and regional satellite-based navigation systems are currently in use. Known examples of Global Navigation Satellite Systems (GNSS) include the US-based Global Positioning System (GPS), Russia's Global Navigation Satellite System (GLONASS), China's BeiDou Navigation Satellite System (BDS) and the Galileo system of the European Union. In addition, a number of further systems, global, regional and national, are operating or under development, including Japan's Quasi-Zenith Satellite System (QZSS) or India's Indian Regional Navigation Satellite System (IRNSS) or regional Satellite-Based Augmentation Systems (SBAS), like Wide Area Augmentation System (WAAS) or European Geostationary Navigation Overlay Service (EGNOS).

In general, satellite-based navigation systems enable a position of a satellite receiver to be determined based on propagation time delays of satellite signals received from a plurality of satellites located at known locations in an orbit. The satellite signals are used to transmit ranging codes and navigation data messages. The navigation data messages of the GPS, GLONASS, BDS, QZSS, IRNSS and SBAS are generally not authenticated, making them susceptible to manipulation, including manipulating their content as part of a spoofing attack, blocking or deliberate delaying their transmission by jamming or replay attack. Such manipulations may lead to a falsification of the position or other information determined by a receiver-side device, such as rover.

Some of the navigation data messages transmitted by the Galileo system are authenticated using the Open Service Navigation Message Authentication (OS-NMA) scheme based on the Timed Efficient Stream Loss-tolerant Authentication (TESLA) protocol. However, in certain circumstances, even the Galileo OS-NMA scheme may be subjected to potential manipulation. For example, in situations with limited reception, such as urban canyons or other areas where only a relatively small subset of navigation satellites are in the line of sight of a receiver-side device, an attacker with an improved field of vision may wait for a given TESLA key and then forge a malicious satellite navigation data message matching the TESLA key for the device located in the urban canyon. Moreover, due to the nature of GNSS messages in general, some navigation data messages remain identical across several transmission intervals, making them susceptible to further types of attacks.

Accordingly, it is a challenge to provide improved authentication methods, devices and systems for satellite-based navigation systems (SNS). Preferably, the provided methods and devices should provide a high degree of data security, while minimizing the amount of additional information that needs to be provided to authenticate SNS messages. Preferably, the methods and devices should be applicable to different GNSS and data transmission systems.

According to a first aspect, an authentication method for a satellite-based navigation system (SNS) is provided. The method comprises:

obtaining, by an authentication server, a plurality of message authentication bundles from a plurality of reference receiver stations, each message authentication bundle comprising at least one hash for authenticating a corresponding SNS message received by a respective reference receiver station from at least one satellite of the SNS;

inserting, by the authentication server, at least a subset of the hashes comprised in the obtained message authentication bundles into a probabilistic data structure (PDS), which forms at least a part of a validation filter for authenticating a corresponding subset of SNS messages; and distributing the validation filter to at least one receiver-side device.

Among others, the inventors have recognized that by the use of a probabilistic data structure, a relatively high degree of certainty can be provided for authenticating a plurality of SNS messages, while keeping the size of a corresponding validation filter small. In particular, the size of the PDS itself will only depend on certain system parameters and is independent of the number of SNS messages received by a plurality of reference receiver stations. Due to its probabilistic nature, a PDS, such as a Cuckoo filter, may not allow the insertion of some SNS messages. Thus, only a subset of all received SNS messages may be included.

At the same time, by combining hashes received from a plurality of reference receiver stations, potential attacks affecting only a subset of the reference receiver stations can be detected and dealt with by the authentication server using majority decisions for building the validation filter.

It is important to point out that the authentication server can obtain the plurality of message authentication bundles from a plurality of reference receiver stations directly or indirectly or in part directly and in part indirectly. Directly means that the authentication server obtains the message authentication bundles straightly from the reference receiver stations. Indirectly means that the authentication server obtains the message authentication bundles through a reference receiver station service provider managing a plurality of reference receiver stations.

In particular, in at least one implementation, the step of inserting at least a subset of the hashes to the PDS may specifically comprise: comparing, by the authentication server for a given authentication interval, message authentication bundles received from a plurality of reference receiver stations with each other; and attempting to insert into the PDS, based on the comparison, only hashes repetitively received, for a given SNS message, in a majority of the message authentication bundles received from a set of reference receiver stations that exceeds a predefined quorum, such that only SNS messages matching repetitively received hashes can be successfully authenticated by the validation filter.

In other words, the hash of an SNS message should be added to the PDS only if the majority of the message authentication bundles contains it and if those message authentication bundles come from at least a predefined quorum of reference receiver stations.

According to at least one implementation, one or more reference receiver stations from which at least one deviating hash for the given SNS message was received in a message authentication bundle, e.g. an inconsistent hash reported by a single or a minority of reference receiver stations or not exceeding a predefined quorum so not inserted in the PDS, are identified by the authentication server and a corresponding localized alert is generated. The localized alert is generated with respect to the identified one or more reference receiver stations related to the deviating hash, or to one or more locations within an area served by such reference receiver stations, in particular, with respect to SNS messages received in the one or more locations from one or more corresponding satellites visible in such one or more locations. Such localized alerts can be used to trigger appropriate countermeasures by individual receiver-side devices or other system components and/or to draw attention to the fact that an attack is ongoing in a certain area and/or for one or more satellites visible in a certain area.

In other words, a receiver-side device may receive alerts indicating that one or more satellites visible in one or more locations has been spoofed. For instance, this allows the receiver-side device, if in a location specified by the alert, to take appropriate actions to exclude the spoofed one or more satellites from the processing to determine its position.

Different types of PDS are known from different areas of data processing. According to at least one implementation, the PDS comprised in the validation filter is implemented as a Cuckoo filter comprising m buckets, each bucket having b entries and each entry having a length of f bits, where m, b and f are positive integers. During one authentication interval, each hash of the subset of hashes to be inserted into the PDS is processed using the Cuckoo filter to identify at least two corresponding buckets, to select one entry of the identified at least two buckets, and to populate the selected entry with a fingerprint of f bits of the respective hash as long as an empty entry is available in the at least two identified buckets. Such a Cuckoo filter has a fixed size of $m \times b \times f$ bits and can therefore be transmitted to one or multiple receiver-side devices using a fixed bandwidth transmission channel. For example, such a relatively small, fixed size data structure may be transmitted periodically on an auxiliary channel of a navigation satellite or other communication satellite.

According to at least one implementation, the validation filter may further comprise s elements of a stash list, wherein each element has a length of e bits, where s and e are positive integers, resulting in a fixed length stash list of $s \times e$ bits. As the Cuckoo filter is a fixed size and relatively small PDS, it is not guaranteed that all the hashes to be inserted into the PDS can be inserted into the Cuckoo filter. In fact, the stash list may be used to increase the number of SNS messages authenticated by the validation filter, in case the Cuckoo filter is relatively densely populated. So, during one authentication interval, in case that, for a given hash of the subset of hashes to be inserted into the PDS, no empty entry is available in the at least two identified buckets of the Cuckoo filter, if available, an empty element of the stash list is populated with a fingerprint of e bits of the respective hash.

According to at least one implementation, the validation filter is rebuilt during each authentication interval. In alternative, during one authentication interval, validation data corresponding to SNS messages no longer received from a plurality of reference receiver stations is removed from the validation filter built during an earlier authentication interval, and hashes corresponding to SNS messages to be newly authenticated in the one authentication interval are inserted, if possible, to the validation filter built during the earlier authentication interval.

According to at least one implementation, the validation filter is configured using at least one of the following parameters: a number n of SNS messages expected to be received from the at least one satellite during one authentication interval; a desired total size of the validation filter; a desired size of the PDS, in particular a Cuckoo filter; a desired size of a stash list associated with the PDS; a desired false positive rate ε of the PDS and, finally, a desired load factor α of the PDS.

It is important to point out that a receiver-side device, on its own, cannot discriminate if the SNS messages received are authentic, hence coming from at least one satellite of the SNS, or spoofed, hence manipulated by an attacker. So, according to a second aspect, an authentication method for a SNS is provided, comprising:

receiving, by a receiver-side device, at least one SNS message sent by at least one satellite of the SNS;

computing, by the receiver-side device, a hash for each received SNS message;

receiving, by the receiver-side device, a validation filter distributed by an authentication server for authenticating a set of SNS messages, wherein the validation filter comprises at least a PDS;

querying, by the receiver side-device, the validation filter using the hash computed for each received SNS message, comprising querying the PDS to verify if the respective hash could have been inserted into the PDS;

treating, by the receiver-side device, any received SNS message, whose hash cannot be verified as being used in building the validation filter, as not authenticable by the validation filter; and treating, by the receiver-side device, any received SNS message, whose hash can be verified as being likely to have been used in building the validation filter, as authentic with a certain probability.

According to at least one implementation, the validation filter further comprises a stash list and the step of querying the validation filter further comprises, in case querying the PDS indicates that a given hash could not have been inserted successfully into the PDS, querying, by the receiver side-device, the stash list to verify if the given hash could have been inserted into the stash list.

The authentication method according to the second aspect can be used by a receiver-side device to determine whether or not a specific SNS message received is likely to be authentic or not. Unlike known validation methods, in general the disclosed method does not enable the receiver-side device to determine with absolute certainty that a received SNS message is either authentic or not. However, based on the PDS and an optionally associated stash list, the receiver-side device can at least establish whether a received SNS message could have been used in building the validation filter with a given probability, making it very likely that said SNS message is authentic, or could not have been used in building the validation filter, making it very unlikely that said SNS message is authentic.

Several use cases are possible. For instance, in a first use case, the hash of the SNS message received by the receiver-side device has been inserted in a Cuckoo filter; consequently, this SNS message can be treated as authentic with a probability bounded by the configured false positive rate ε. In a second use case, the hash of the SNS message received by the receiver-side device has not been inserted in the Cuckoo filter but the validation filter comprises also a stash list and the fingerprint of e bits of this SNS message matches with the content of one of the elements of the stash list; consequently, this SNS message can be treated as authentic with a probability related to the ratio between the number of bits of the hash of the SNS message and the e bits of a stash list element (so certainly authentic if the ratio is greater or equal to 1). In a third use case, the hash of the SNS message received by the receiver-side device has not been inserted in the Cuckoo filter and the validation filter does not comprise a stash list; consequently, this SNS message can be treated as not authenticable as it is possible that the hash of this SNS message could not have been inserted in the Cuckoo filter as already densely populated. The probability of this use case can be minimized by configuring properly the size of the Cuckoo filter according to the desired load factor α and by inserting only different hashes (in fact, the insertion fails if the same hash is inserted at least 2b+1 times). In a fourth use case, the hash of the SNS message received by the receiver-side device has not been inserted in the Cuckoo filter but the validation filter comprises also a stash list that is not full, so there is at least one empty element, and the fingerprint of e bits of this SNS message is not present in any of the elements of the stash list; consequently, this SNS message can be treated as certainly not authentic. In a fifth use case, the hash of the SNS message received by the receiver-side device has not been inserted in the Cuckoo filter but the validation filter comprises also a stash list that is full, so there is not an empty element, and the fingerprint of e bits of this SNS message is not present in any of the elements of the stash list; consequently, this SNS message can be treated as not authenticable as it is possible that the hash of this SNS message could not have been inserted in the Cuckoo filter as already densely populated and could not have been inserted in the associated stash list as already full. The probability of this use case can be minimized by configuring properly the size of the Cuckoo filter according to the desired load factor α and the size of the stash list and by inserting only different hashes (in fact, the insertion fails if the same hash is inserted at least 2b+1 times).

It is important to point out that a reference receiver station cannot, on its own, discriminate if the SNS messages received are authentic and so coming from at least one satellite of the SNS or spoofed and so manipulated by an attacker. So, according to a third aspect, an authentication method for an SNS system is provided, comprising:

receiving, by at least one reference receiver station, a plurality of SNS messages sent by at least one satellite of the SNS;

computing, by each one of the reference receiver stations, corresponding hashes for the received plurality of SNS messages; and transmitting, from each one of the reference receiver stations to an authentication server, a corresponding plurality of message authentication bundles, each message authentication bundle comprising at least the hash computed for the respective SNS message and, optionally, information from the respective SNS message.

The authentication method according to the third aspect enables a central authentication server, in each authentication interval, to compare hashes generated by different reference receiver stations exceeding a predefined quorum, and thus to implement a majority decision as detailed above. In this way, even if a single or subset of the reference receiver stations is either directly manipulated or subject to a localized attack, the authentication server can still establish, with high probability, if the hash of a SNS message should be inserted in the validation filter or not.

In at least one implementation, the validation filter comprises at least the PDS and, optionally, an associated stash list populated while inserting at least a subset of the hashes of the message authentication bundles obtained by the authentication server in an authentication interval. In case multiple PDS and/or stash lists are generated, e.g. for different satellite constellations, the validation filter may comprise some or all of PDS and/or stash lists.

Optionally, the validation filter may also comprise metadata associated with the generation of the validation filter itself, comprising at least one of configuration data of at least one hash function, used by the reference receiver station and/or by the receiver-side device and/or by the authentication server, comprising in turn an identifier of the hash function and/or a truncation level to be applied to the hash function output (so the number of most or least significant bits of the hash function output that should be taken), configuration data of the PDS, configuration data of the associated stash list, and configuration data of the authentication interval (like for instance the initial GNSS time and the interval length).

In at least one embodiment, the hash used by the reference receiver station and/or by the receiver-side device and/or by the authentication server is a cryptographic hash function.

It is important to point out that the reference receiver station and the receiver-side device and the authentication server may all use the same hash function to minimize complexity. It is also possible that different hash functions are used, by the reference receiver station and receiver-side device, to compute the hash of the SNS message on one side and, by the authentication server and the receiver-side device, to populate the Cuckoo filter on the other side. For instance, SHA-512 can be used by the reference receiver station and by the receiver-side device to calculate the hash x of a SNS message M as x=SHA-512(M), while SHA-256 can be used by the authentication server and by the receiver-side device for the Cuckoo filter so for instance to define the y=fingerprint(x) as the f least significant bits of SHA-256(x) and to define the partial-key Cuckoo hashing with h1(x) as the mb most significant bits of SHA-256(x) (where mb is the number of bits required to represent the m number of buckets contained in the Cuckoo filter) and h2(x) as the mb most significant bits of the computation "h1(x) XOR SHA-256(y)".

Due to the above design of the validation filter, in at least one implementation, the PDS has a fixed length for each authentication interval.

In a further implementation, the validation filter may be transmitted from the authentication server to the receiver-side device as part of an authentication message, wherein the authentication message further comprises a digital signal generated by the authentication server to ensure the authenticity of the authentication message and/or wherein the authentication message is transmitted using a secure channel, ensuring the authenticity of the authentication message.

According to a fourth aspect, different devices for authenticating messages of a SNS system are provided. The devices comprise at least one processing unit configured to perform, in different embodiments, the method steps performed by the authentication server according to the first aspect, one of the reference receiver stations according to the second aspect, or the receiver-side device according to the third aspect, respectively.

According to a fifth aspect, an authentication system for a SNS is provided, comprising: a plurality of reference receiver stations configured to perform the steps according to the third aspect; an authentication server configured to perform the steps of the method according to the first aspect; and at least one receiver side-device configured to perform the steps of the method according to the second aspect.

Various improved methods, devices and systems will be described in more detail with reference to the attached drawings.

FIG. 5 shows a table of hashes used to implement a majority decision by an authentication server.

Before specific details of the disclosed authentication methods, devices and systems are described, first a general architecture of a satellite-based navigation system (SNS) 100 is described with reference to FIG. 1. While the term satellite-based navigation system is used throughout the description for better understanding, the disclosed approach may also be applicable to non-navigation applications, such as positioning applications, including Precise Point Positioning (PPP) and/or Real-Time Kinematic (RTK) positioning, and timing applications, including time-synchronization services.

Figure 1:
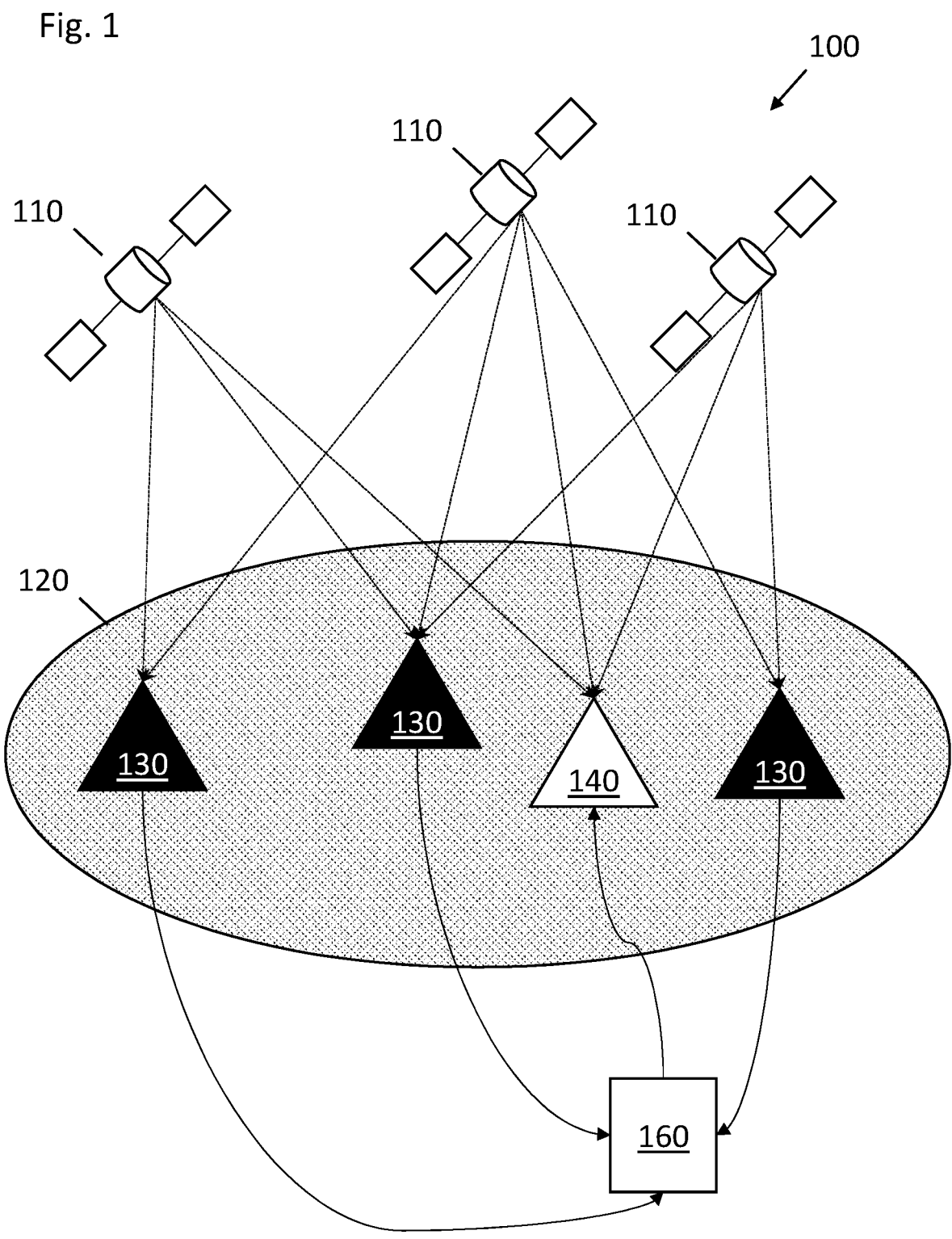
FIG. 1 shows, in a schematic way, a satellite-based navigation system (SNS) and an authentication system for a SNS with devices for authenticating messages of the SNS.

According to FIG. 1, the SNS comprises a number of navigation satellites 110. The navigation satellites 110 orbit earth and transmit various SNS messages, e.g. navigation data messages, by means of broadcast to a plurality of receivers. In the example depicted in FIG. 1, a total of three navigation satellites 110 are visible from within a service area 120 of the SNS 100. Corresponding SNS messages transmitted by the satellites 110 are received by three reference receiver stations 130 as well as one receiver-side device 140, which may be a mobile receiver, also referred to as "rover" in the context of SNS systems. Attention is drawn to the fact that the exemplary system depicted in FIG. 1 is simplified for representational reasons, and that typical SNS will comprise a larger number of satellites 110, reference receiver stations 130 and receiver-side devices 140.

According to the present disclosure, in order to enable the receiver-side device 140 to perform at least a certain degree of authentication of received SNS messages, each one of the reference receiver stations 130 computes a hash, also referred to as a hash value, for each received SNS message. The computed hashes, and potentially some data of the decoded SNS messages, are included by the reference receiver stations 130 in corresponding message authentication bundles transmitted to at least one authentication server 160 using a first communication channel, such as a terrestrial or satellite data link. An authentication server 160 analyzes the message authentication bundles and generates, based on at least some of the hashes contained therein, a validation filter for use by the receiver-side device 140 to authenticate at least a subset of the received SNS messages.

The validation filter may be provided, as indicated in FIG. 1, by a second communication channel such as a terrestrial or satellite data link, to the receiver-side device 140. For example, the validation filter may be transmitted by a wired or wireless data network either directly or using a content distribution network (CDN). Alternatively, the authentication server 160 may feed the validation filter to a satellite for broadcasting the filter to the receiver-side device 140, for example on the L band used by the respective satellites.

The architecture shown in FIG. 1 can be used for many different authentication schemes. However, most known authentication schemes do not scale well in an SNS comprising a relatively large number of receiver-side devices 140 and/or for processing a relatively large number of SNS messages. In particular, if a hash is computed for each received SNS message and forwarded to the receiver-side device 140, the bandwidth required for the transmission of the validation data would generally grow linearly with the number of received SNS messages, which is undesirable.

However, as explained in further detail below, according to various embodiments of the present disclosure, the authentication server 160 computes a probabilistic data structure (PDS), which essentially has a fixed size, independent of the number of SNS messages received from the reference receiver stations 130. Accordingly, the disclosed system greatly reduces the bandwidth requirements for the SNS authentication architecture shown in FIG. 1.

The authentication server can obtain the plurality of message authentication bundles from a plurality of reference receiver stations directly as described above or indirectly or in part directly and in part indirectly.

Figure 2:
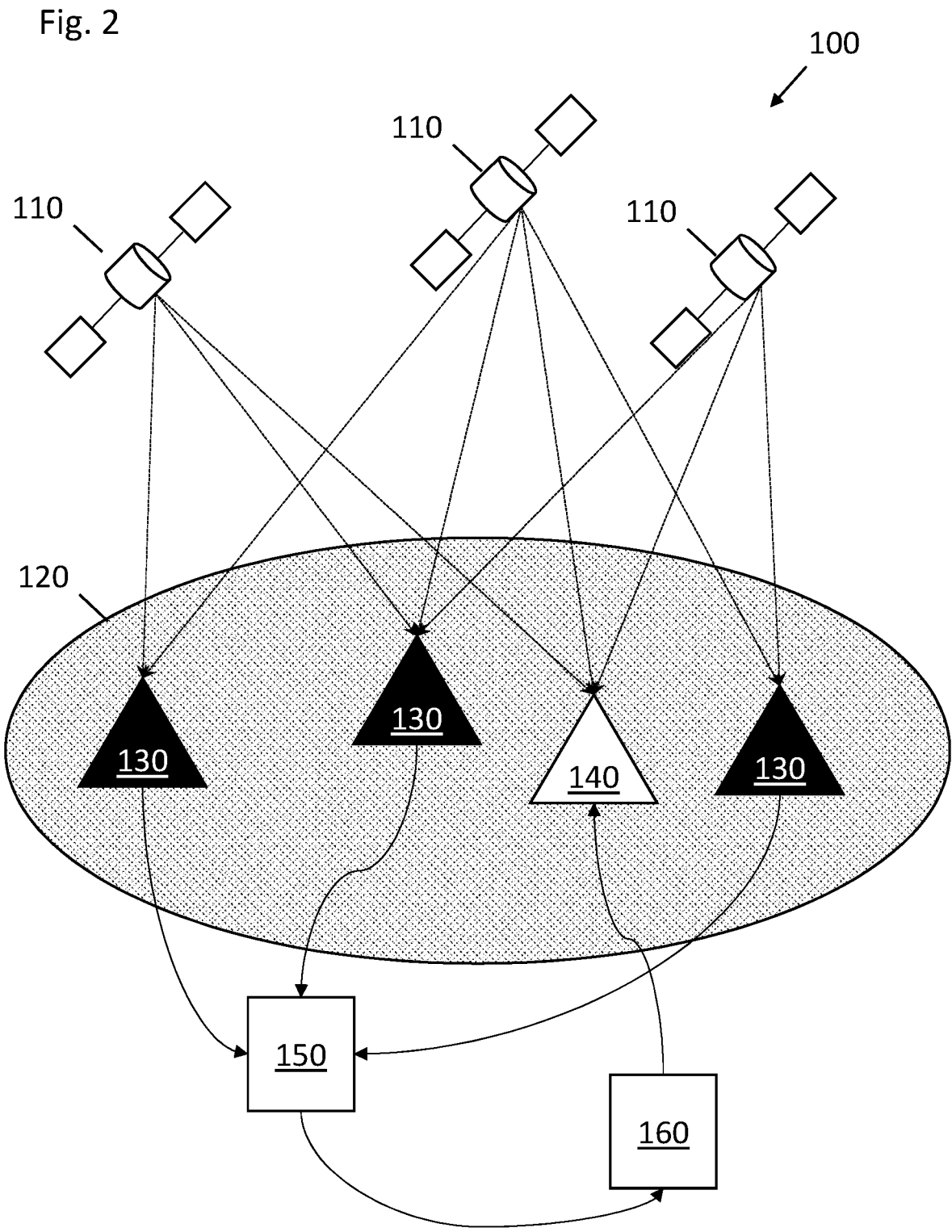
FIG. 2 shows, in a schematic way, an authentication system for a SNS where at least one reference receiver station service provider is used by an authentication server to indirectly obtain a plurality of message authentication bundles from a plurality of reference receiver stations.

FIG. 2 shows an authentication system for a SNS where at least one reference receiver station service provider 150 is used by the authentication server 160 to indirectly obtain a plurality of message authentication bundles from a plurality of reference receiver stations 130. In fact, all or a subset of the reference receiver stations 130 decode each SNS message received from at least one of the navigation satellites 110, and forward corresponding data to a reference receiver station service provider 150 managing the reference receiver stations 130. In this case, the hash value for each received SNS message can be computed by each reference receiver stations 130 or by the reference receiver station service provider 150 if it obtains the raw, so not decoded, SNS message content. If the hash value is computed by a reference receiver station 130, the corresponding message authentication bundle can be generated by the reference receiver stations itself or by the reference receiver station service provider 150. Instead, if the hash value is computed by the reference receiver station service provider 150, the corresponding message authentication bundle can be generated only by the reference receiver station service provider 150. It is important to point out that the reference station service provider 150 may perform further computing based on the received data, such as providing localized correction data based on known, precise locations of the reference receiver stations 130.

Figure 3:
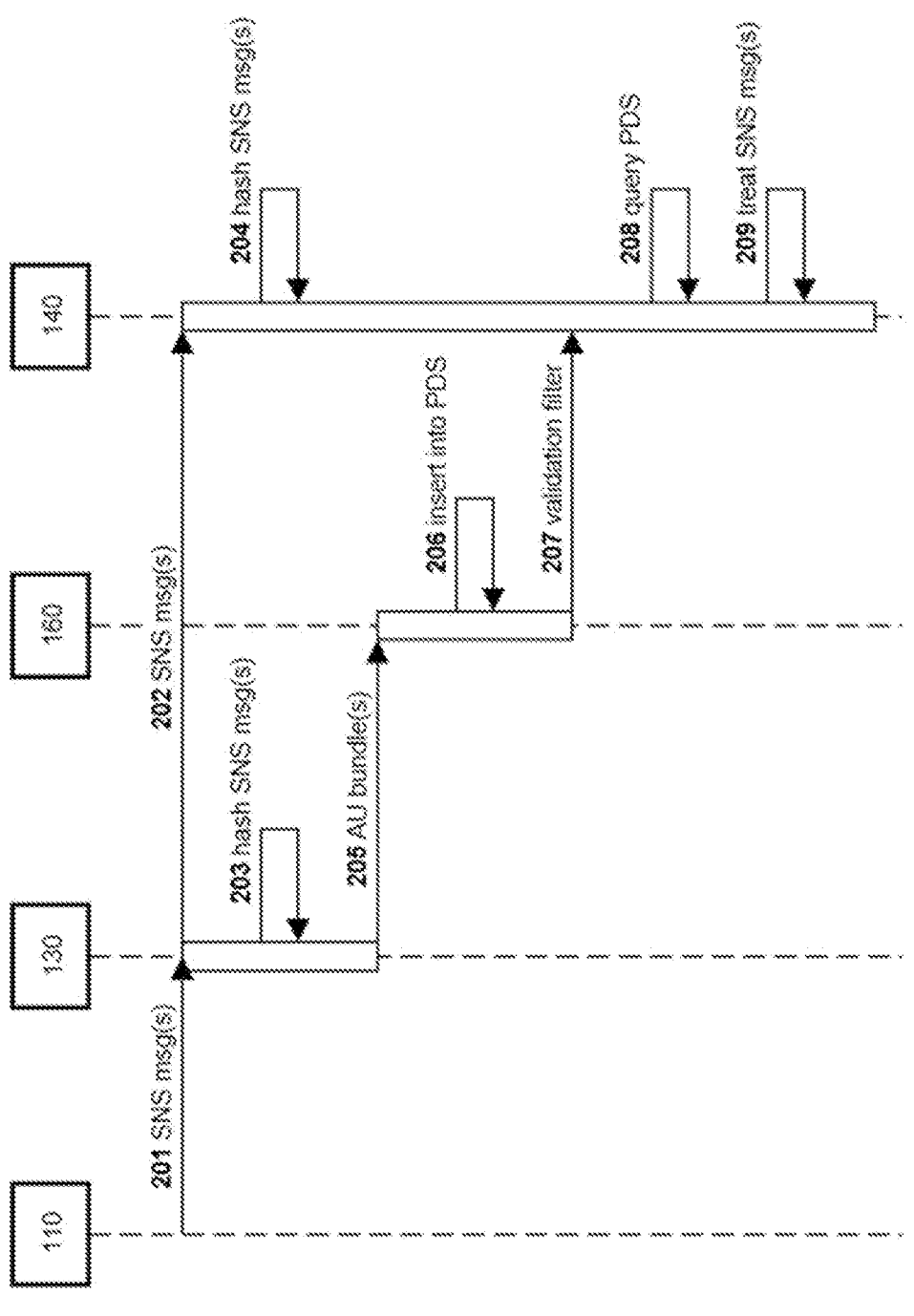
FIG. 3 shows, in a schematic way, messages exchanged and processing steps performed by different entities of an authentication system for a SNS.

FIG. 3 shows, in a schematic manner, some messages exchanged and processing steps of an authentication method performed by various entities of authentication system for a SNS.

In step 201, an SNS message generated by a navigation satellite 110 is received by at least one reference receiver station 130. Typically, the same SNS message is also received by other reference receiver stations (not shown) and, in step 202, by a receiver-side device 140 located in the service area 120.

Next, in step 203, the reference receiver station 130 computes a hash for each received SNS message using a first hash function hA. Alternatively, the hashing may also be performed by a reference receiver station service provider 150 or the authentication server 160 as long as it can be ensured that they can obtain the received raw SNS message content unchanged, so not decoded. Similarly, in step 204, the receiver-side device 140 computes a hash for each received SNS message. For this purpose, the reference receiver station 130 and the receiver-side device 140 use the same hash function hA.

Attention is drawn to the fact that, during operation, a large number of SNS messages are received by the various reference receiver stations 130 and the receiver-side device 140, and that for reasons of representational simplicity, only processing of a single SNS message received by all the mentioned entities can be shown in FIG. 3. Nonetheless, in a typical situation, at least some of the SNS messages received in steps 201 and 202 and hashed in steps 203 and 204 will be identical, i.e. are received and decoded consistently by two different entities.

Next, in step 205, the reference receiver station 130 sends to at least one authentication server 160 the message authentication bundle created for each SNS message received, each message authentication bundle comprising at least the hash computed in step 203 and, optionally, an identifier or part of the content of the SNS message received in step 201.

In step 206, the message authentication bundle is received by the authentication server 160 and all or parts of it may be inserted into a PDS. In its simplest form, the hash received as part of a message authentication bundle may be inserted into the PDS, as long as space for further hashes is available in the PDS. This will allow the receiver-side device 140 to verify each corresponding SNS message with a certain probability. As the PDS fills up, not every hash may be inserted, making it impossible to verify such late received SNS messages. However as detailed below with reference to FIGS. 4A to 4D, preferably only a controlled subset of received hashes is inserted into the PDS in step 206. In particular, only hashes consistently received in a majority of the message authentication bundles received from a set of reference receiver stations 130 that exceeds a predefined quorum may be inserted into the PDS.

If the validation filter is considered to be complete, for example at the end of a predetermined authentication interval or once the PDS has been filled to a certain extent, in step 207, the authentication server 160 distributes the validation filter to all receiver-side devices 140 desiring authentication of SNS messages. For example, the validation filter may be transmitted directly, as part of a subscription, to a large set of receiver-side devices 140, for example using a content distribution network, or may be broadcast to all receiver-side devices 140 capable of receiving the validation filter.

Once the validation filter has been received by the receiver-side device 140, in step 208, the receiver-side device 140 queries the validation filter comprising the PDS using the hashes computed in step 204. Querying the PDS with a given hash will not ensure that the SNS message received in step 202 by the receiver-side device 140 is identical to the SNS message received in step 201 by the reference receiver stations 130. However, the receiver-side device 140 can determine, with a relative high, configurable likelihood, if an SNS message resulting in the same hash could have been used to construct the PDS. Inversely, the validation filter allows to determine if such a hash has not been inserted into the PDS. However, as not all hashes are necessarily included into the PDS in step 206, this still does not guarantee that the respective SNS message has not been received by any of the reference receiver stations, but may suggest that such a hash was deliberately excluded by the authentication server.

Thus, in step 209, based on the relative likelihood of the correctness of the SNS message received in step 202, the receiver-side device 140 may treat the SNS message as either not authenticable by the validation filter or as authentic with a certain probability.

Figures 6A, 6B:
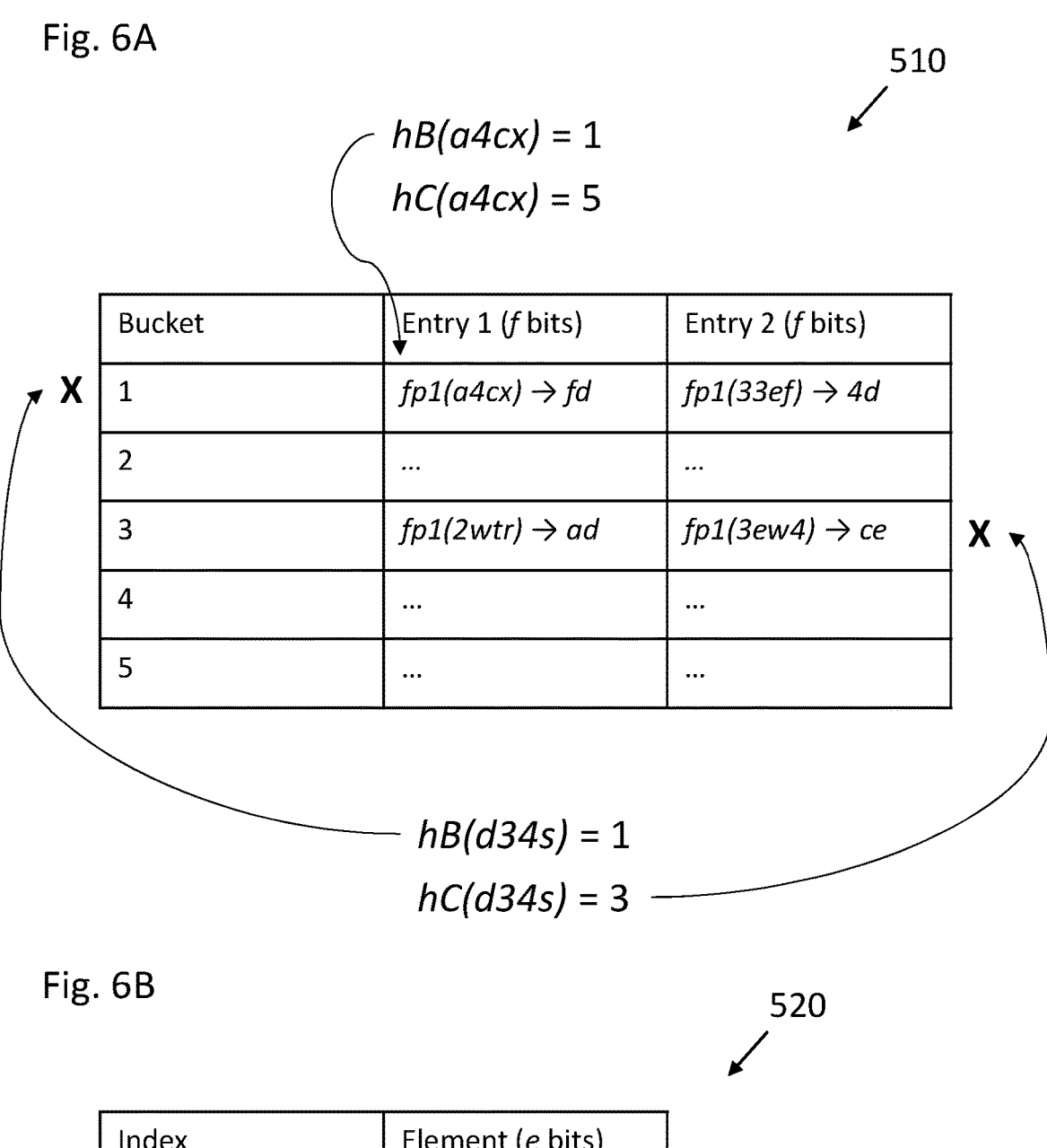
FIGS. 6A and 6B show data structures of a validation filter.

In the following, a specific implementation of an authentication method, based on a more detailed analysis of the general scheme detailed in FIG. 3, is described with respect to FIGS. 4A to 4D. Exemplary data structures and values processed by the authentication method are shown in FIGS. 5, 6A and 6B.

The actors shown in FIGS. 4A to 4D correspond to the entities explained above with regard to FIG. 2, as well as a node 170 of a content distribution network (CDN) or other service provider (not shown) used to distribute authentication messages generated by the authentication server 160 to a plurality of receiver-side devices 140. The reference receiver station 130 may be part of a reference network 180 of a reference station service provider 150. Similarly, the authentication server 160 and the CDN node 170 or other service provider may be seen as a part of an authentication network 190.

As an example, the reference network is the CORS network provided by the National Geodetic Survey of the US National Oceanic and Atmospheric Administration (NOAA) whose receivers may be used as reference receiver stations 130 with fixed and known, with high level of accuracy, locations. As another example, a set of conventional receiver-side devices may be used as reference receiver stations 130 with locations known with or without high level of accuracy, which report feedback data including message authentication bundles directly or indirectly, via a reference station service provider 150, back to the authentication server 160. A combination of both source is also possible, as the subsequent authentication is essentially based on a majority decision as detailed below. Moreover, message authentication bundles for SNS messages received from different satellite constellations may be combined by the authentication server 160, thus providing authentication services for multiple SNS constellations, e.g. GPS, GLONASS, BDS, Galileo, QZSS, IRNSS or for multiple navigation services, such as Satellite Based Augmentation System (SBAS), PPP or PPP-RTK.

Figure 4A:
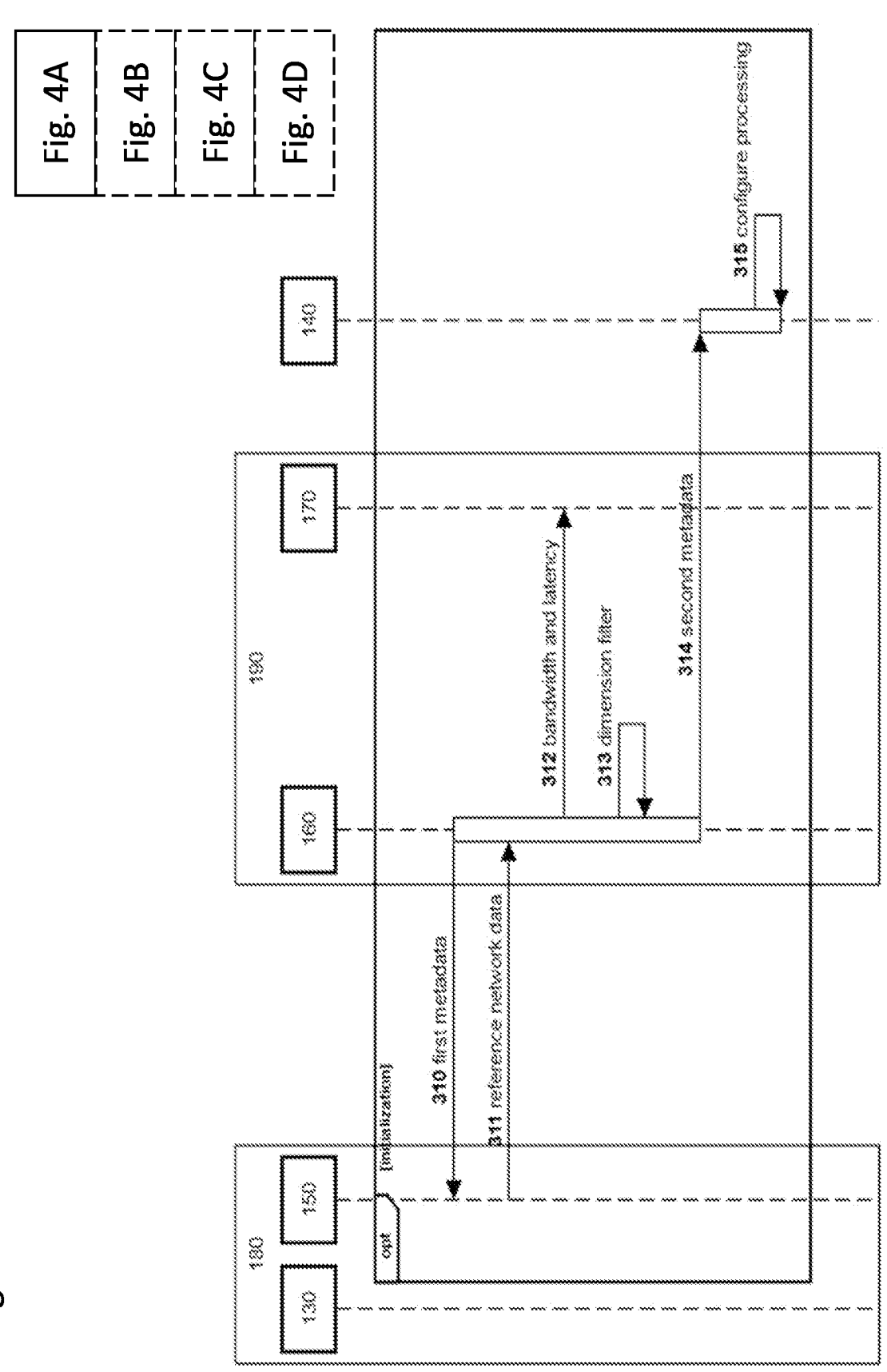
FIGS. 4A to 4D show with additional details, in a schematic way, messages exchanged and processing steps performed by different entities of an authentication system for a SNS.

In a first, optional part of the method shown in FIG. 4A, various metadata is exchanged to configure the respective entities for their operation. Alternatively, the various parameters mentioned below may be fixed by design or may be included as metadata in some of the other messages, e.g. a message authentication bundle, an RTCM message, or an authentication message, described below with regard to FIGS. 4B and 4D. In this case, part or all of the initialization procedure shown in FIG. 4A may be omitted.

In step 310, optionally, the authentication server 160 provides first metadata to the reference receiver station service provider 150. The first metadata may comprise a name or other identifier of a first hash function hA and a corresponding truncation level used by the reference receiver stations 130 and/or the reference receiver station service provider 150 to compute the hashes of the individual SNS messages.

In step 311, optionally, the reference receiver station service provider 150 provides to the authentication server 160 locations of the reference receiver stations 130, hardware and firmware versions of the receivers, receiver's antenna details and/or a number of SNS messages expected to be received by the reference network 180 in a given interval of time.

In step 312, the authentication server 160 may specify to the CDN node 170 the expected bandwidth and latency for distribution of authentication messages. Anyway, in case the distribution is enabled by means of a satellite broadcast, only a fixed bandwidth and fixed latency may be available for authentication data.

In step 313, the authentication server 160 computes appropriate configuration parameters for a validation filter and configures a corresponding filter structure accordingly. For example, based on a number n of SNS messages expected to be received from the reference network 180, an authentication interval determined by the authentication server 160, a desired size of the PDS, a desired load factor $\alpha$ of the PDS, a length f of fingerprints stored in the PDS and a target false positive rate $\varepsilon$ of the PDS, the authentication server 160 may define the structure of a PDS, and, optionally, of an associated upper bound fixed size data structure, such as a stash list as further detailed with regard to FIGS. 5 to 6B.

In the detailed example shown in FIG. 6A, a Cuckoo filter 510 having a fixed number of m buckets and b entries per bucket, as well as a fixed bit length f of each entry, is used for implementing the PDS. The Cuckoo filter 510 thus has a fixed size of m×b×f bits. Moreover, as shown in FIG. 6B, in the case that an additional stash list 520 with s elements of length e is provided, the stash list 520 has a maximum size of s×e bits. The validation filter may be associated with some further information, such as a signature computed during each authentication interval and other metadata, which also needs to be included in the total size of the exchanged authentication messages.

As a practical example, for n=170 SNS messages per authentication interval, a desired target false positive rate of $\varepsilon<0.001$, a load factor of $\alpha<0.85$ to minimize the insertion fails, b=4 entries per bucket and a stash list with s≤4 entries with e=128 bits, the number of required buckets can be computed as $m=\lceil n/(b*\alpha)\rceil=\lceil 170/(4*0.85)\rceil=50$, the fingerprint length can be computed as $f=\lceil \log_2(1/\varepsilon)+\log_2(2b)\rceil=13$ bits, giving a total size of the Cuckoo filter of m×b×f=2600 bits and a stash list of maximal s×e=512 bits for each authentication interval.

Based on at least some of the above parameters, the authentication server 160 generates corresponding second metadata and transmits it, in step 314, to the receiver-side devices 140. Typically, the second metadata may comprise at least a subset of the first metadata provided in step 310, in particular the identifier of the used hash function hA and/or a truncation level to be applied to the hash function output, as well as the authentication interval and the configuration parameters (for the PDS and, optionally, for the associate stash list) used for the generation of the validation filter.

Accordingly, in step 315, the receiver-side device 140 may configure its processing parameters to deal with the filter configured by the authentication server 160 in step 313.

Figure 4B:
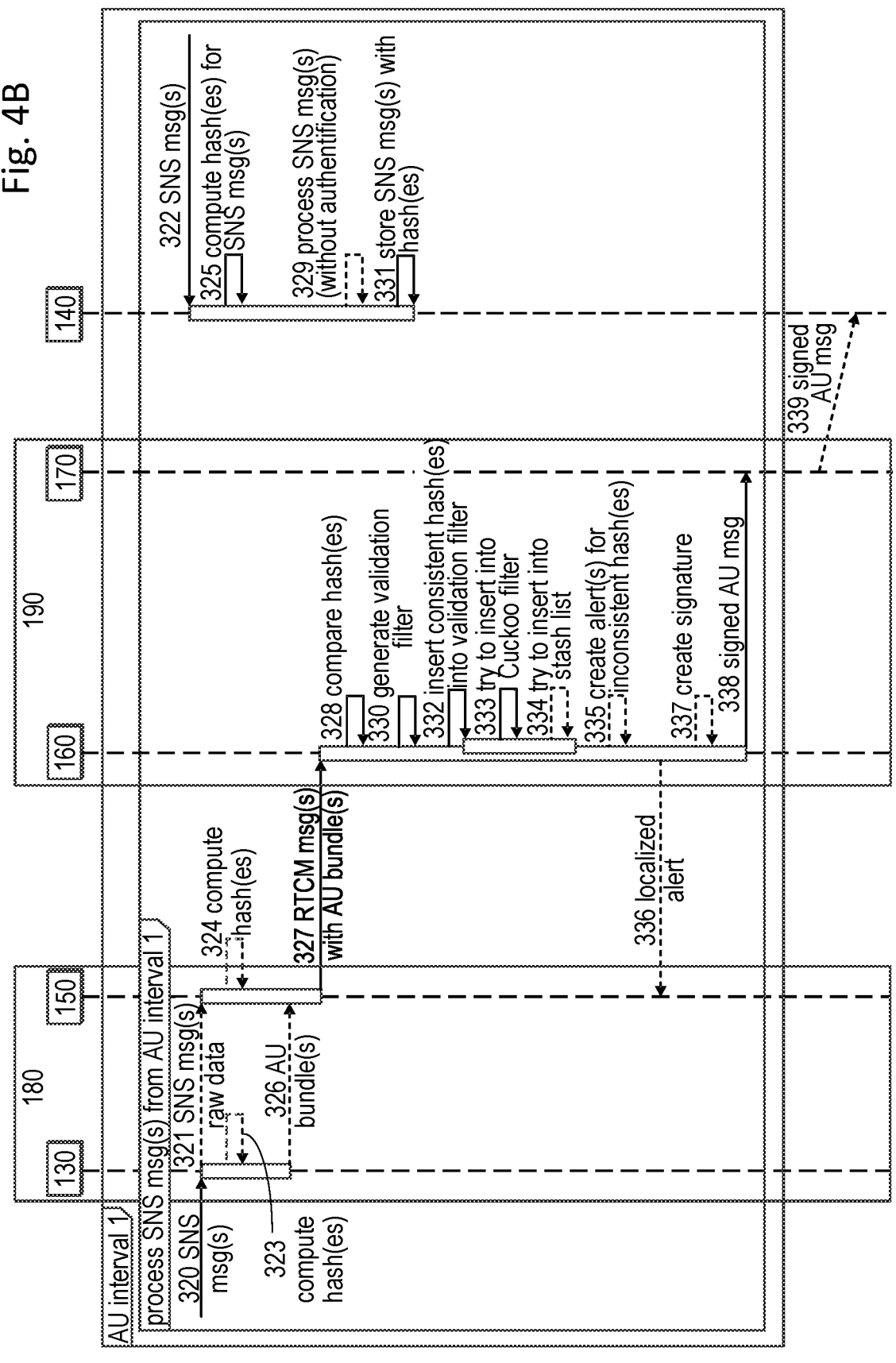

Next, with reference to FIG. 4B, the processing of SNS messages received during an authentication interval by the reference network 180 and the receiver-side device 140, respectively, is described. In the situation depicted in FIG. 4B, no SNS messages have been recently received by either the reference receiver station 130 or the receiver-side device 140. Accordingly, the receiver-side device 140 is not yet in possession of a current validation filter.

In a step 320, the reference receiver station 130 receives one or a plurality of SNS messages. Depending on the implementation, the SNS messages received by the reference receiver station 130 may be decoded and processed locally by the respective reference receiver station 130 or may be forwarded in step 321, essentially unmodified, in a suitable format comprising essentially all raw data of the SNS message to the reference receiver station service provider 150. At a similar time, e.g. during the same authentication interval, the receiver-side device 140 may receive one or more SNS messages in step 322.

The left part of FIG. 4B shows the two alternatives for computing a hash either in step 323 by the reference receiver station 130 or in step 324 by the reference receiver station service provider 150. In the described implementation, a cryptographic hash function is used to compute a message digest. The output of the cryptographic hash function, i.e. the message digest, may optionally be truncated, punched or otherwise reduced to a required length to generate a hash for further processing. Other, non cryptographic, hash functions may also be used to generate the hashes. Similarly, in step 325, the receiver-side device 140 computes a hash for each SNS message received in step 322 using the same hash algorithm used by the reference network 180 and optionally the same truncation level.

If the hash is computed directly by the reference receiver station 130, the reference receiver station 130 will transmit, in a step 326, a corresponding message authentication bundle comprising the computed hash either to the reference receiver station service provider 150 or directly to the authentication server 160. Alternatively, if the SNS message received in step 320 is forwarded essentially unmodified in step 321 to the reference receiver station service provider 150, the reference receiver station service provider 150 may compute the hash for the raw data of the received SNS message in a step 324. Although not shown in the figures, the hashes may also be computed by the authentication server 160 if the SNS messages received by the reference receiver station 130 are forwarded essentially unmodified, in a suitable format comprising essentially all raw data of the SNS message to the authentication server 160, e.g. using a secure transmission channel. It is also possible that the hashes may also be computed by the authentication server 160 on a predefined decoded format of the SNS message received by the reference receiver station 130. In this case the receiver-side device 140 may be forced to verify the authenticity of a certain received SNS message only after its decoding, so investing resources and time probably for a not authentic SNS message and exposing the receiver-side device 140 to a potential denial of service attack.

In step 327, the message authentication bundles are transmitted, either directly from the respective reference receiver station 130 or indirectly, via the reference receiver station service provider 150, to the authentication server 160. The message authentication bundles may be transmitted using an appropriate data field or message of a standardized message format. For example, the reference receiver station 130 or the reference receiver station service provider 150 may forward computed hashes and all or parts of the decoded SNS messages in the RTCM standard 10403.2 format, i.e. Version 3.2 of the Radio Technical Commission for Maritime services (RTCM) standard SC-104 for Differential GNSS (Global Navigation Satellite Systems) Services.

While only a single reference receiver station 130 is shown in FIGS. 4A to 4D, attention is drawn to the fact that, in step 327, the authentication server 160 typically receives message authentication bundles from a plurality of reference receiver stations 130. Accordingly, in a subsequent step 328, the various hashes received for multiple SNS messages can be compared with each other. This is further explained with respect to FIG. 5.

FIG. 5 shows a table of hashes 400 received by the authentication server 160 from different reference receiver stations 130 and for different SNS messages in an authentication interval. Attention is drawn to the fact that in a minimal configuration, the authentication server will only receive the hash itself and an identifier of the source reference receiver station 130, represented by the columns "Hash" and "RRS ID" respectively in FIG. 5. However, in another implementation, the authentication server 160 may also receive a message identifier of a corresponding SNS message as shown in the "Message ID" column.

In the presented example the quorum is set to two and a first SNS message 1 is received only by the first and second reference receiver station 130. In each case, the same hash is reported to the authentication server. Accordingly, as the quorum is set to two and since at least two hashes computed for said SNS message received from two different reference receiver stations 130 are the same, the corresponding hash a4cx is accepted for insertion into the validation filter as detailed later (indicated in bold in FIG. 5).

For a second SNS message, two different hashes are received by three reference receiver stations 130. In particular, the first reference receiver station returns a hash of 25d3, whereas the second and third reference receiver station return a hash of d34s. In this case, as the quorum is set to two, the consistently received value d34s is accepted by a majority vote for inclusion into the validation filter, whereas the deviating, inconsistent hash 25d3 is indicated as potentially fraudulent (indicated by italics in table 400) and is not used for building the filter. As detailed later, in addition, a localized alert may be generated for the second SNS message received by the first reference receiver station from a corresponding satellite.

The third SNS message is received by all reference receiver stations 130. Moreover, each reference receiver station reports the same, consistent hash, which is therefore, as the quorum is set to two, also included in the subset for the validation filter. Similarly, for the fourth SNS message, a consistent hash is received by the second and third reference receiver station so, as the quorum is set to two, it is also included in the subset for the validation filter.

Only a single hash is received for a fifth SNS message by the third reference receiver station. While no deviating hash has been received for the respective SNS message, the reception of a single hash may be considered to be insufficient to reach a quorum, in this example set to two, for including the hash into the validation filter. Nonetheless, since no deviating hash was received for the same SNS message, the received SNS message may not be considered fraudulent. Accordingly, no localized alert may be created for the fifth SNS message. This fifth SNS message may be the result of a delayed delivery. In fact, due to differences in firmware, hardware or networking of the reference receiver stations 130, some authentication bundles for the same SNS message may be obtained in different, closely related authentication intervals. This condition can be easily verified by checking the presence of the considered fifth SNS message hash in the last validation filter distributed. If it is present, it is with high probability the result of a delayed delivery.

As last example, a sixth SNS message is received by the first and the third and by a fourth and a fifth reference receiver station. In this instance, two different hashes, w3r4 and g5t6, are reported twice. Thus, as the quorum is set to two, there is a tie between the reported hashes and neither hash will be included in the validation filter. In absence of further information, no localized alert may be created for the sixth SNS message, as it is impossible to determine which of the received hashes is authentic.

Referring to FIG. 4B again, in step 330 an initially empty validation filter is generated. Specifically, corresponding data structures as shown in FIGS. 6A and 6B for holding validation data will be created based on configuration data computed, for example, in step 313 of FIG. 4A.

Then, in step 332, for each of the hashes received consistently, from a majority of reference receiver stations 130 exceeding a predefined quorum, the insertion into the validation filter is attempted. This corresponds to the hashes indicated in bold in FIG. 5.

Specifically, in a first step 333, the authentication server 160 first attempts to insert each selected hash into a Cuckoo filter 510 as shown in FIG. 6A. In order to insert a hash into the Cuckoo filter 510, the previously computed hash is hashed again by two different hash functions hB and hC to identify, via the partial-key Cuckoo hashing, potential buckets for the insertion operation. Specifically, the second hash function hB can be applied to the hash X to be inserted, and the third hash function hC can be applied to the second hash function hB1 and a first fingerprint function fp1 applied to the hash X to be inserted, e.g. i=msb(hB(X), mb) and j=hC(X)=msb(i⊕hB(fp1 (X)), mb), with i and j representing the first and second bucket candidate for insertion, mb representing the number of bits required to represent the m number of buckets contained in the Cuckoo filter, X representing the hash value to be inserted, msb(K, n) returning the n leftmost or most significant bits of K, fp1 (K) representing a fingerprint function providing for instance the first f most significant bits of hB(K), and ⊕ representing a bitwise exclusive-or (xor) function.

In is important to point out that the first hash function hA used by the reference receiver stations and by the receiver-side devices to compute the hash of the SNS message received may be the same as the second hash function hB used in the partial-key Cuckoo hashing.

In the example presented in FIG. 6A, the hash a4cx to be inserted may result, for example, in the second and third hashes of 1 and 5 corresponding to the first and fifth bucket of the Cuckoo filter 510. The first fingerprint function fp1 returns a fingerprint of fd for this hash, which is stored in as first entry of the first bucket in the example presented in FIG. 6A. The entry to store the fingerprint is randomly selected among the free entries available in the first and the fifth buckets. Attention is drawn to the fact that, in the specific implementation, the entries for each bucket do not comprise the entire hash to be authenticated, but only the f bits generated by the fingerprint function fp1.

Further hashes may be added in the same manner to fill the Cuckoo filter 510. As another example, the hash d34s may result, for example, in the second and third hashes of 1 and 3 corresponding to the first and third bucket of the Cuckoo filter 510. However, as shown in FIG. 6A, each corresponding entry of the first and third bucket is already occupied by other fingerprints at the time the authentication server 160 attempts to insert the hash d34s. Specifically, the first entry of the first bucket comprises the fingerprint of the hash 4acx and the second entry of the first bucket comprises a fingerprint of the hash 33ef. Similarly, in the first and second entry of the third bucket, corresponding fingerprints of further hashes are already stored. Accordingly, it is not possible to enter the hash d34s into the Cuckoo filter 510.

Depending on the available transmission bandwidth and/or required size of the validation filter, it may be accepted that not every hash is entered into the validation filter. In this case, validation by the receiver-side device 140 for a corresponding SNS message will fail, indicating that the corresponding SNS message was not used to construct the validation filter. Due to the probabilistic approach of the used Cuckoo filter 510, this does not prove to the receiver-side device 140 that the corresponding SNS message is fraudulent. However, it remains impossible for the receiver-side device 140 to assert whether the corresponding SNS message received is actually fraudulent or did not fit into the Cuckoo filter 510.

Accordingly, in order to improve a hit rate of the validation filter in the case of a relatively highly populated Cuckoo filter 510 and when referring back to FIG. 4B, in a step 334, the authentication server 160 may insert such a hash or a second fingerprint of it into a so-called stash list 520 as shown in FIG. 6B.

In the described example, the stash list 520 is filled as long as free elements are available. Unlike for the fingerprints stored in the Cuckoo filter 510, the position of the respective fingerprint within the stash list 520 does not provide any information about the stored hash. Accordingly, in the depicted embodiment, a longer fingerprint based on a second fingerprint function fp2 returning e bits for each hash is stored in each list element to limit the possibility of a false positive hit. In the presented example, the last three characters of the hash are stored as fingerprint. That is to say, a truncation may be performed for generating the fingerprint. While not shown in FIG. 6B, in an alternative implementation, the entire hash may be stored in each stash list 520 element.

The above steps are repeated for each hash to be inserted into the validation filter. Moreover, as already detailed with regard to FIG. 5, for some or all inconsistently received hash not included in the validation filter, a corresponding localized alert may be created in optional step 335. For this purpose, the individual reference receiver stations 130 or the reference receiver station service provider 150 may provide a fixed, known locations of the respective reference receiver station 130 to the authentication server 160, for instance as part of the authentication bundles. The localized alerts may be specific for a particular reference receiver station 130, for a corresponding local area of the reference receiver station 130, or even more specifically for SNS messages of at least one satellite visible in the corresponding local area. This is due to the fact, that the rest of the data from other satellites received by the same reference receiver station 130 may still be authentic, for example, as a spoofing attack has been performed only on a subset of the satellites visible at that local area. In general, however, the alert should not be sent for a satellite without reference to a specific location as spoofing activities are typically only related to one or more specific locations.

The created alerts may either be reported in optional step 336 to a third entity, such as the reference receiver station service provider 150 or a server collecting data from the receiver-side devices 140, or may be included in the generated validation filter for later reporting to the receiver-side device 140.

In step 337, the authentication server creates a signature which may be used to prove the authenticity of a correspondingly signed authentication message, comprising the previously populated validation filter. The digital signature can be generated for instance using the Elliptic Curve Digital Signature Algorithm (ECDSA) with the curve secp256r1 and so with a total length of 512 bits.

In step 338, the signed authentication message is transmitted from the authentication server 130 to at least one CDN node 170 for distribution.

Steps 337 and 338 are performed at the end of the first authentication interval. Any SNS message received after step 328 will be processed in the next authentication interval as detailed later with respect to FIG. 4D.

As no authentication filter is available on the side of the receiver-side device 140 at this stage, the receiver-side device 140 may process each received SNS message without previous authentication in step 329. For example, the receiver-side device 140 may compute its position based on the received SNS messages despite the fact that they have not been authenticated at this stage.

To enable authentication at a later stage, in step 331, the receiver-side device 140 stores the received SNS messages and/or parts of their content together with the hash computed in step 325 for later authentication.

Figure 4C:
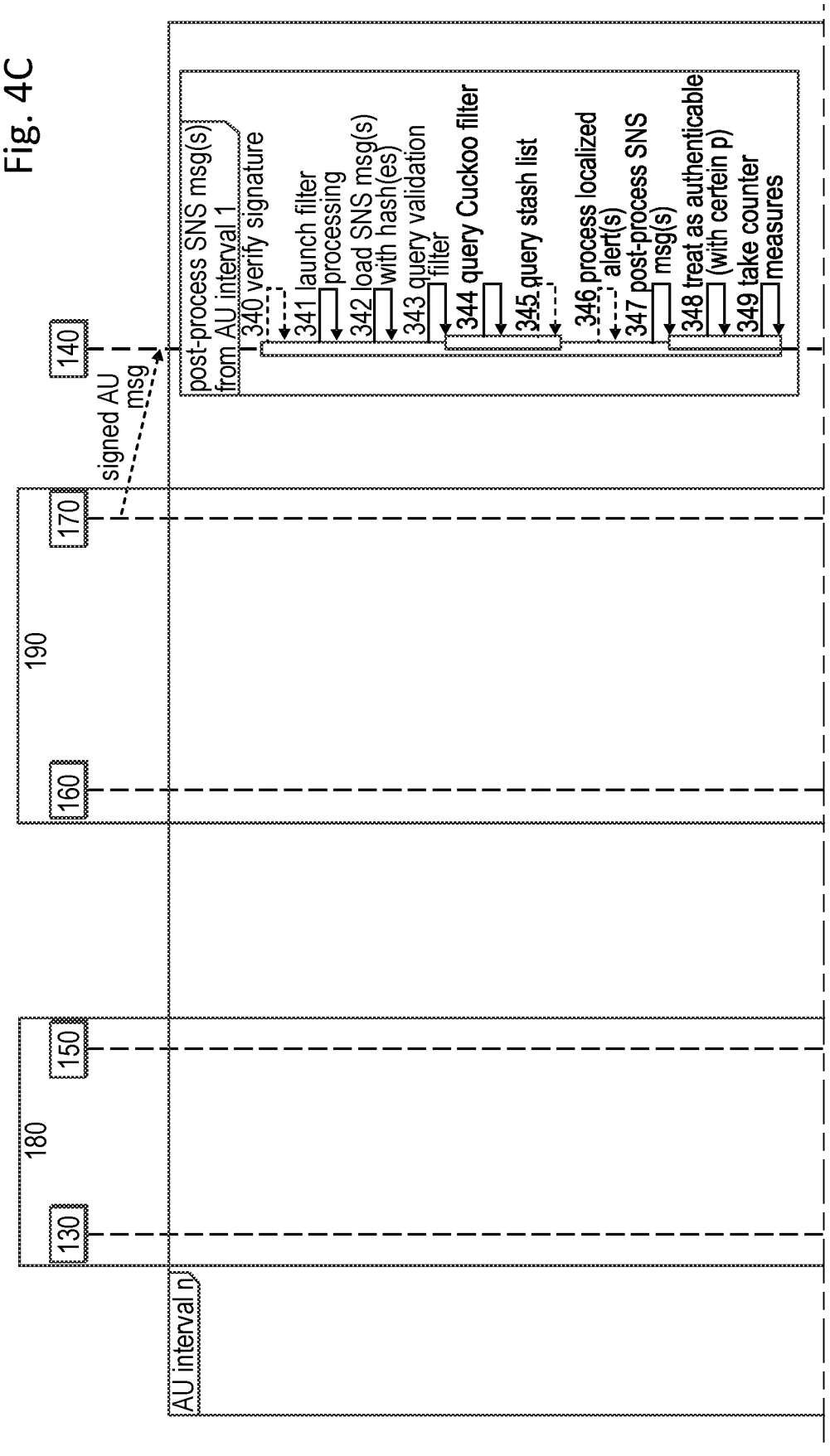

FIG. 4C shows such a post-processing of received SNS messages from an earlier authentication interval, e.g. the first authentication interval, by the receiver-side device 140.

After the receiver-side device 140 receives an authentication message from a CDN node 170 or directly from the authentication server 160, it may optionally verify an associated signature of the authentication message in a step 340. Then, in step 341, it launches a processing task to deal with the filter dimensioned by the authentication server 160 in step 313, configured in step 315. Due to the processing and transmission delays, this may happen some seconds after the end of the first authentication interval, for with the validation filter was computed. Thus, in step 342, SNS messages received by the receiver-side device 140 during the authentication interval, during which the validation filter was created, e.g. the authentication interval 1, are loaded together with their corresponding hashes.

Thereafter, in step 343, the validation filter received as part of the signed authentication message in step 339 is queried. For this processing, the receiver-side device 140 may optionally use time information contained in the SNS message to be validated. For example, if the GNSS time of the SNS message differs in absolute value from the GNSS time of the received validation filter for more than the authentication interval, the receiver-side device should infer that the validation filter authenticating it has not been received and so the SNS message cannot be authenticated using the received validation filter.

Querying the validation filter may be performed as follows. Based on the second and third hash functions hB and hC used in the Cuckoo filter generation, the output of the fingerprint function fp1 of each hash computed in step 325 is looked up in corresponding entries of the Cuckoo filter 510 in step 344. For example, when querying the Cuckoo filter 510 for hash a4cx, a corresponding fingerprint fd can be found in entry 1 of the first bucket, thus resulting in a positive hit and so the corresponding SNS message can be treated as authentic with a probability bounded by the configured false positive rate $\varepsilon$. Inversely, when trying to query for the hash d34s, each entry of corresponding buckets 1 and 3 is filled with different fingerprints, indicating that the corresponding hash has not been used to build the Cuckoo filter 510. Thus, based on the Cuckoo filter 510 alone, the receiver-side device 140 can only determine that the hash d34s was not included in the Cuckoo filter 510. In this case the corresponding SNS message can be treated as not authenticable as it is possible that the hash of this SNS message could not have been inserted in the Cuckoo filter as already densely populated. The probability of this condition can be minimized by configuring properly the size of the Cuckoo filter according to the desired load factor $\alpha$ and by inserting only different hashes (in fact, the insertion fails if the same hash is inserted at least 2b+1 times).

However, in the case that a corresponding stash list 520 is also provided, in step 345, a corresponding element can be looked up in the stash list 520. In the example presented in FIG. 6B, the stash list 520 contains a corresponding fingerprint indicating that the hash d34s was likely used in the construction of the validation filter after all. In this case the corresponding SNS message can be treated as authentic with a probability related to the ratio between the number of bits of the hash of the SNS message and the e bits of the fingerprint stored in the stash list element (so certainly authentic if the ratio is greater or equal to 1).

In the case that a hash cannot be identified in either the Cuckoo filter 510 or the stash list 520 and the stash list is not full, so there is at least one empty element, the corresponding SNS message can be treated as certainly not authentic. Instead, in the case that a hash cannot be identified in either the Cuckoo filter 510 or the stash list 520 and the stash list is full, so there is not an empty element, the corresponding SNS message can be treated as not authenticable as it is possible that the hash of this SNS message could not have been inserted in the Cuckoo filter as already densely populated and could not have been inserted in the associated stash list as already full. The probability of this condition can be minimized by configuring properly the size of the Cuckoo filter according to the desired load factor $\alpha$ and the size of the stash list and by inserting only different hashes (in fact, the insertion fails if the same hash is inserted at least 2b+1 times).

In an optional step 346, the receiver-side device 140 may also process localized alerts included in the authentication message 339. For example, it may learn that a spoofing attack is ongoing for the SNS messages of one or more satellites in an area close to the first reference receiver station. In this case, further actions may be taken by the receiver-side device.

Based on the above, the receiver-side device 140 may post-process the previously received SNS messages in a step 347.

In particular, in step 348, those SNS messages successfully queried in the validation filter are treated as authenticable with a certain probability. Due to the lossy nature of the used hash and fingerprint functions, the receiver-side device 140 in general cannot say with absolute certainty whether a received SNS message was actually received consistently by a plurality of reference receiver stations exceeding a predefined quorum. Nonetheless, based on appropriate dimensioning of the validation filter as well as the used hash and fingerprint functions, a desired degree of certainty can be reached with regard to authentication, allowing the receiver-side device 140 to keep its availability at the highest possible level.

Contrary, if a hash corresponding to a received SNS message cannot be queried successfully in step 343 and/or is subject to a localized alert received and processed in step 346, in a step 349 the receiver-side device 140 may take appropriate countermeasures to adapt to the potentially hostile environment. For example, a positioning algorithm may ignore such SNS messages or give a higher weight to SNS messages treated as authenticable rather than SNS messages treated as not authenticable. It may switch to a different, more restrictive operating mode to limit the impact of local spoofing activities or trigger a local alarm to inform a user that a spoofing attack may be ongoing. Moreover, though not shown in FIG. 4C, the receiver-side device 140 may report back, either to the authentication server 160 or the reference receiver station service provider 150 or another central entity that it may be subject to a spoofing or similar attack.

Figure 4D:
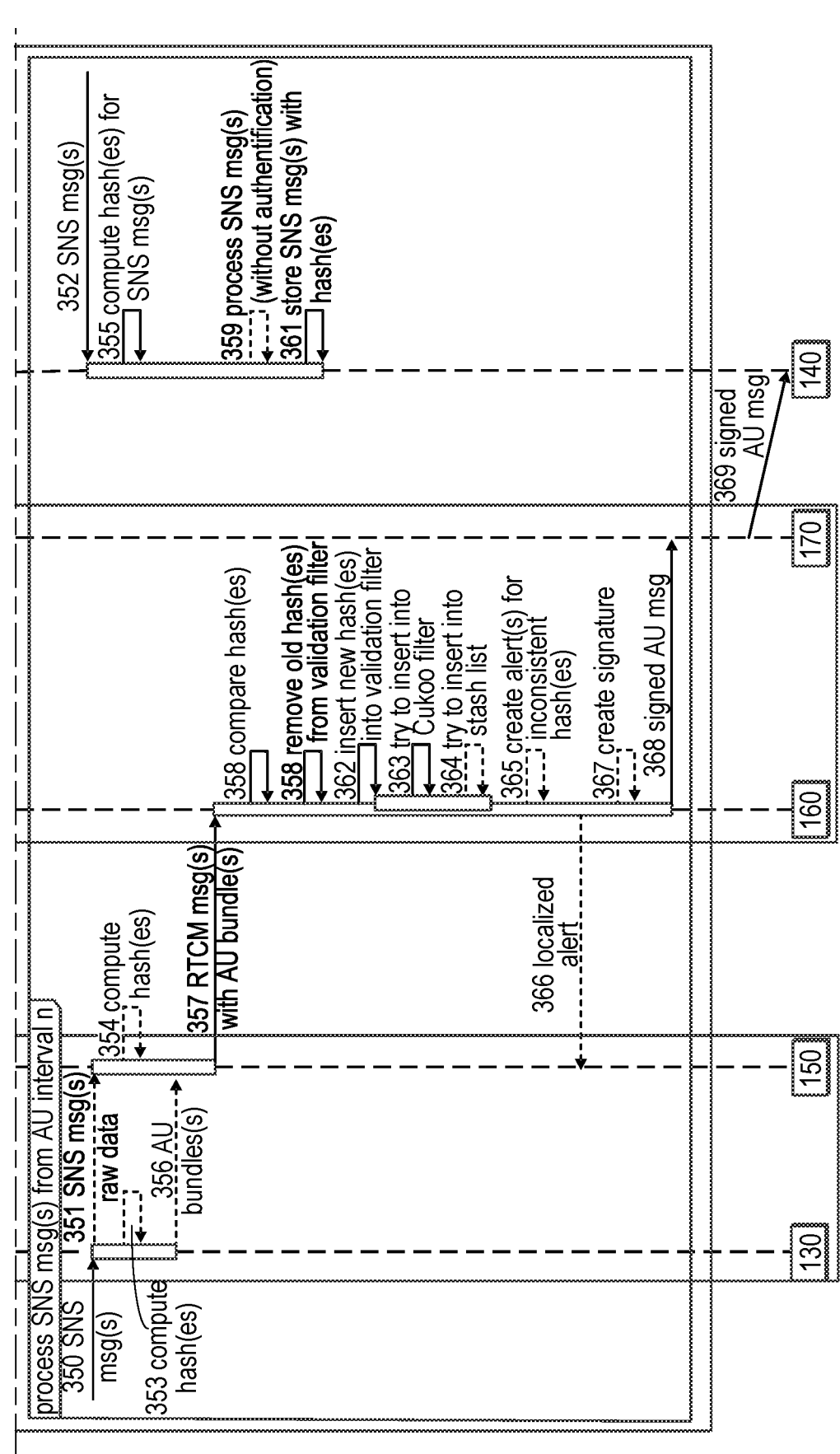

FIG. 4D shows the processing of further SNS messages received by the reference receiver stations 130 and the receiver-side device 140 in an authentication interval n. The method steps 350 to 369 essentially correspond to the method steps 320 to 339 describe above. Accordingly, only the steps that differ will be described below.

In particular, in a step 360, rather than generating a completely new validation filter, the authentication server 160 may remove hashes no longer received from a majority of the reference receiver stations 130 exceeding a predefined quorum during the authentication interval n to make space in the Cuckoo filter 510 or stash list 520. Similarly, in subsequent step 362, only hashes newly received in the authentication interval n and/or newly included in the table of hashes 400 shown in FIG. 5 are newly inserted into the validation filter. Such a partial regeneration or update of a previously computed validation filter reduces the processing power required. Moreover, it may also support or improve a differential compression of later authentication messages. A partial regeneration of a validation filter is particularly suited to the Cuckoo filter 510 and stash list 520 of the embodiment presented above, as well as authentication of SNS messages, as certain SNS messages may persist over a relatively long period of time, e.g. several authentication intervals.

While a very specific example has been described with reference to FIGS. 4A to 6B, the skilled person will understand that the order of the steps presented with regard to FIGS. 4A to 4D is only exemplary. Moreover, the chosen parameters, hash and fingerprint functions as well as the specific PDS may be changed to suit the specific requirements of the validation filter. For example, other types of Bloom filters may be used instead of the Cuckoo filter 510.

Moreover, as detailed above, while many of the optional steps provide certain advantages and improve the authentication scheme taken as a whole, they may be partially or completely omitted in case the bandwidth for transmitting the authentication filter or the available computing resource are limited.

Figure 7:
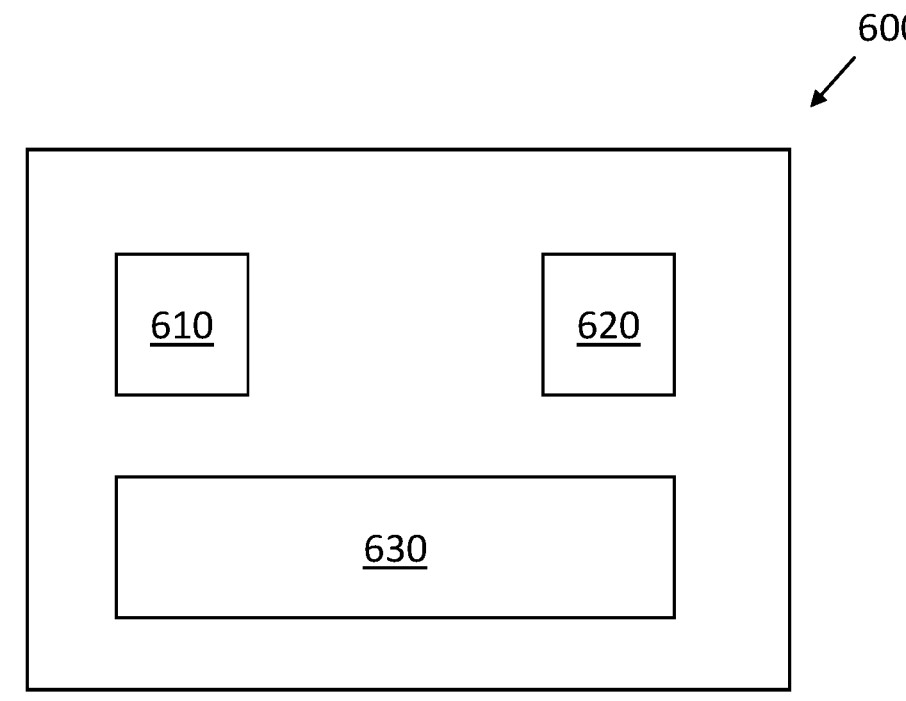
FIG. 7 shows a schematic diagram of a reference receiver apparatus.

FIG. 7 shows a schematic diagram of a reference receiver station apparatus 600 according to the present disclosure, e.g. the reference receiver station 130 of FIGS. 1 to 4D. It comprises a satellite receiver circuit 610 for receiving at least one SNS message, a communication interface 620 for transmitting at least authentication bundles, and a processing unit 630, comprising, for example, purpose-built circuitry or a general purpose processor for executing computer instructions stored inside a memory or on a computer readable medium. The processing unit 630 is configured to perform
the method steps performed by the reference receiver station
130 as detailed above with respect to FIG. 1 to FIG. 8 shows
a schematic diagram of a receiver-side device apparatus 700
according to the present disclosure, e.g. the receiver-side
device 140 of FIGS. 1 to 4D. It comprises a satellite receiver
circuit 710 for receiving at least one SNS message, a
communication interface 720 for receiving at least a vali-
dation filter for a plurality of SNS messages, and a process-
ing unit 730, comprising, for example, purpose-built cir-
cuitry or a general purpose processor for executing computer
instructions stored inside a memory or on a computer
readable medium. The processing unit 730 is configured to
perform the method steps performed by the receiver-side
device 140 as detailed above with respect to FIGS. 1 to 6B.

Figure 9:
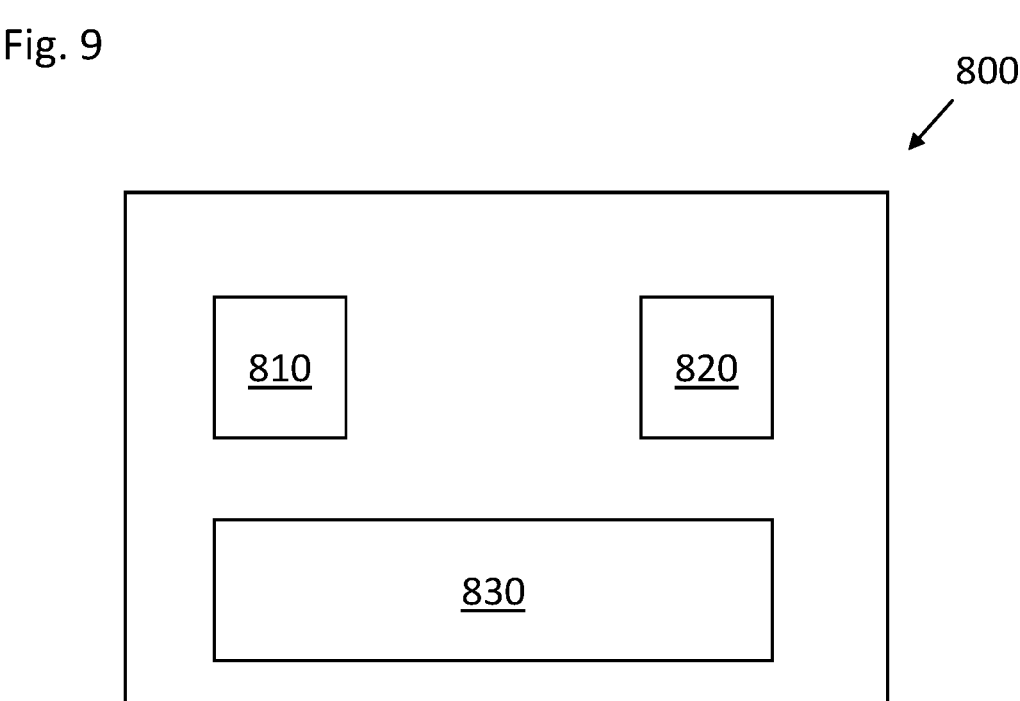
FIG. 9 shows a schematic diagram of an authentication apparatus.

FIG. 9 shows a schematic diagram of an authentication
server apparatus 800 according to the present disclosure, e.g.
the authentication server 160 of FIGS. 1 to 4D. It comprises
a first communication interface 810 at least for receiving
authentication bundles and a second communication inter-
face 820 for transmitting at least a validation filter for a
plurality of SNS messages, and a processing unit 830,
comprising, for example, purpose-built circuitry or a general
purpose processor for executing computer instructions
stored inside a memory or on a computer readable medium.
The processing unit 830 is configured to perform the method
steps performed by the authentication server 160 as detailed
above with respect to FIGS. 1 to 6B.

Figure 8:
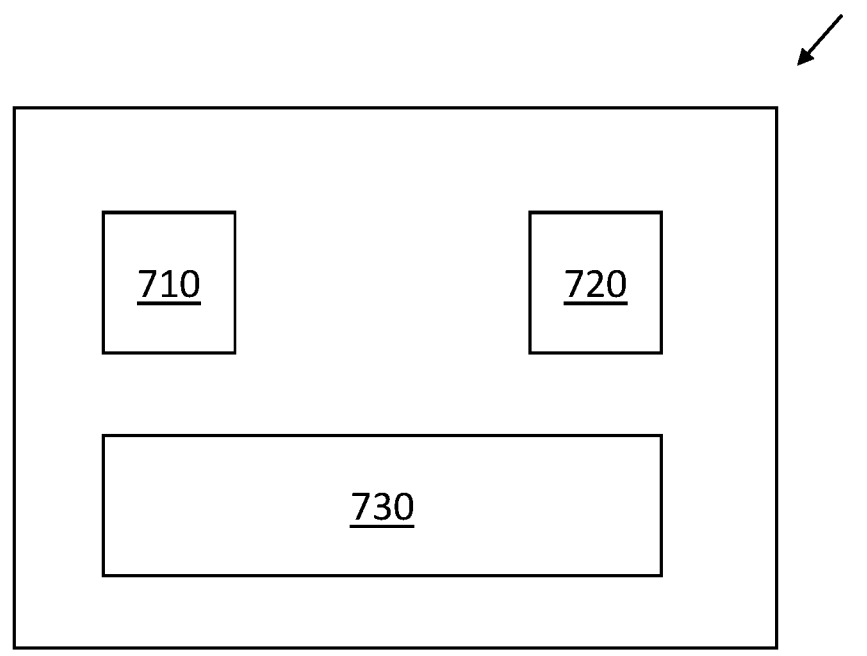
FIG. 8 shows a schematic diagram of a receiver-side apparatus.
Figure 10:
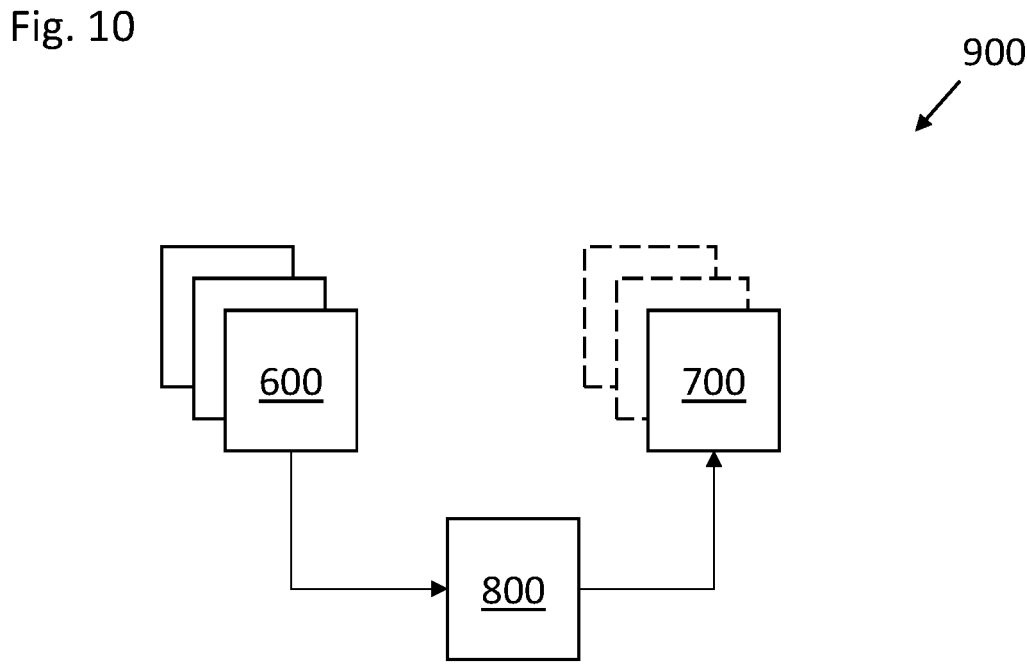
FIG. 10 shows a schematic diagram of an authentication system for a SNS.

FIG. 10 shows a schematic diagram of an authentication
system 900 for a SNS 100 comprising a plurality of refer-
ence receiver station apparatuses 600 as shown in FIG. 7, an
authentication server apparatus 800 as shown in FIG. 9 and
one or more receiver-side device apparatuses 700 as shown
in FIG. 8.

REFERENCE SIGNS

100 satellite navigation system
110 navigation satellite
120 service area
130 reference receiver station
140 receiver-side device
150 reference receiver station service provider
160 authentication server
170 CDN node
180 reference network
190 authentication network
201-369 method steps
400 table of hashes
510 Cuckoo filter
520 stash list
600 reference receiver station apparatus
610 satellite receiver circuit (of 600)
620 communication interface (of 600)
630 processing unit (of 600)
700 receiver-side device apparatus
710 satellite receiver circuit (of 700)
720 communication interface (of 700)
730 processing unit (of 700)
800 authentication server apparatus
810 communication interface (of 800)
820 second communication interface (of 800)
830 processing unit (of 800)
900 authentication system

The invention claimed is:

1. An authentication method for a satellite-based naviga-
tion system (SNS), the method comprising:
   obtaining, by an authentication server, a plurality of
      message authentication bundles from a plurality of
      reference receiver stations, each message authentica-
      tion bundle comprising at least one hash for authenti-
      cating a corresponding SNS message received by a
      respective reference receiver station from at least one
      satellite of the SNS;
   inserting, by the authentication server, at least a subset of
      the hashes comprised in the obtained message authen-
      tication bundles into a probabilistic data structure
      (PDS), which forms at least a part of a validation filter
      for authenticating a corresponding subset of SNS mes-
      sages; and
   distributing the validation filter to at least one receiver-
      side device.

2. The authentication method of claim 1, wherein insert-
ing at least a subset of the hashes to the PDS comprises:
   comparing, by the authentication server for a given
      authentication interval, message authentication bundles
      received from a plurality of reference receiver stations
      with each other; and
   attempting to insert into the PDS, based on the compari-
      son, only hashes repetitively received, for a given SNS
      message, in a majority of the message authentication
      bundles received from a set of reference receiver sta-
      tions that exceeds a predefined quorum, such that only
      SNS messages matching repetitively received hashes
      can be successfully authenticated by the validation
      filter.

3. The authentication method of claim 2, further compris-
ing:
   identifying, by the authentication server, one or more
      reference receiver stations from which at least one
      deviating hash, for the given SNS message, was
      received in a message authentication bundle; and
   generating, by the authentication server, a localized alert
      with respect to the identified one or more reference
      receiver stations related to the deviating hash, and/or to
      one or more locations within an area served by such
      reference receiver stations, with respect to SNS mes-
      sages received in the one or more locations from one or
      more corresponding satellites visible in such one or
      more locations.

4. The authentication method of claim 1, wherein
   the validation filter comprises m buckets of a Cuckoo
      filter, wherein each bucket has b entries, and each entry
      has a length of f bits, wherein m, b and f are positive
      integers; and
   during one authentication interval, each hash of the subset
      of hashes to be inserted into the PDS is processed using
      the Cuckoo filter to identify at least two corresponding
      buckets, to select one entry of the identified at least two
      buckets, and to populate the selected entry with a
      fingerprint of bits of the respective hash as long as an
      empty entry is available in the at least two identified
      buckets.

5. The authentication method of claim 4, wherein
   the validation filter further comprises s elements of a stash
      list, wherein each element has a length of e bits,
      wherein s and e are positive integers; and
   during one authentication interval, in case that, for a given
      hash of the subset of hashes to be inserted into the PDS,
      no empty entry is available in the at least two identified
      buckets of the Cuckoo filter, if available, an empty
      element of the stash list is populated with a fingerprint
      of e bits of the respective hash.

6. The authentication method of claim 1, wherein
the validation filter is rebuilt during each authentication
    interval; or,
during one authentication interval, validation data corre-
    sponding to SNS messages no longer received from a
    plurality of reference receiver stations is removed from
    the validation filter built during an earlier authentica-
    tion interval, and hashes corresponding to SNS mes-
    sages to be newly authenticated in the one authentica-
    tion interval are inserted to the validation filter built
    during the earlier authentication interval.
7. The authentication method of claim 1, wherein the
validation filter is configured using at least one of the
following parameters:
    a number n of SNS messages expected to be received
        from the at least one satellite during one authentication
        interval;
    a specified total size of the validation filter;
    a specified size of the PDS, in particular a Cuckoo filter;
    a specified size of a stash list associated with the PDS;
    a specified false positive rate ε of the PDS; or
    a specified load factor α of the PDS.
8. An authentication method for a satellite-based naviga-
tion system (SNS), the method comprising:
    receiving, by a receiver-side device, at least one SNS
        message sent by at least one satellite of the SNS;
    computing, by the receiver-side device, a hash for each
        received SNS message;
    receiving, by the receiver-side device, a validation filter
        distributed by an authentication server for authenticat-
        ing a set of SNS messages, wherein the validation filter
        comprises at least a probabilistic data structure (PDS);
    querying, by the receiver-side device, the validation filter
        using the hash computed for each received SNS mes-
        sage, comprising querying the PDS to verify if the
        respective hash could have been inserted into the PDS;
    treating, by the receiver-side device, any received SNS
        message, whose hash cannot be verified as being used
        in building the validation filter, as not authenticable by
        the validation filter; and
    treating, by the receiver-side device, any received SNS
        message, whose hash can be verified as being likely to
        have been used in building the validation filter, as
        authentic with a certain probability.
9. The authentication method of claim 8, wherein the
validation filter further comprises a stash list, and querying
the validation filter further comprises:
    in case querying the PDS indicates that a given hash could
        not have been inserted successfully into the PDS,
        querying, by the receiver-side device, the stash list to
        verify if the given hash could have been inserted into
        the stash list.
10. An authentication method for a satellite-based navi-
gation system SNS, the method comprising:
    receiving, by a plurality of reference receiver stations, a
        plurality of SNS messages sent by at least one satellite
        of the SNS;
    computing, by each one of the reference receiver stations,
        corresponding hashes for the received plurality of SNS
        messages; and
    transmitting, from each one of the reference receiver
        stations to an authentication server, a corresponding
        plurality of message authentication bundles, each mes-
        sage authentication bundle comprising at least the hash
        computed for the respective SNS message.

11. The authentication method of claim 1, wherein the
validation filter comprises at least:
    the PDS, and an associated stash list populated while
        inserting at least a subset of the hashes of the message
        authentication bundles obtained by the authentication
        server in an authentication interval.
12. The authentication method of claim 1, wherein the
PDS has a fixed length for each authentication interval.
13. The authentication method of claim 1, wherein the
validation filter is transmitted from the authentication server
to the receiver-side device as part of an authentication
message, wherein the authentication message further com-
prises a digital signature generated by the authentication
server to ensure the authenticity of the authentication mes-
sage and/or wherein the authentication message is transmit-
ted using a secure channel ensuring the authenticity of the
authentication message.
14. A device for authenticating messages of a satellite-
based navigation system (SNS), the device comprising:
    at least one processing unit configured to:
        obtain a plurality of message authentication bundles from
            a plurality of reference receiver stations, each message
            authentication bundle comprising at least one hash for
            authenticating a corresponding SNS message received
            by a respective reference receiver station from at least
            one satellite of the SNS; and
        insert at least a subset of the hashes comprised in the
            obtained message authentication bundles into a proba-
            bilistic data structure (PDS), which forms at least a part
            of a validation filter for authenticating a corresponding
            subset of SNS messages.
15. An authentication system for a satellite-based navi-
gation system (SNS), the authentication system comprising:
    a plurality of reference receiver stations;
    an authentication server; and
    at least one receiver-side device,
    wherein:
        the plurality of reference receiver stations is configured
            to:
            receive a plurality of SNS messages sent by at least
                one satellite of the SNS;
            compute corresponding hashes for the received plu-
                rality of SNS messages; and
            transmit to the authentication server a corresponding
                plurality of message authentication bundles, each
                message authentication bundle comprising at least
                the hash computed for the respective SNS mes-
                sage;
        the authentication server is configured to:
            obtain the plurality of message authentication bundles
                from the plurality of reference receiver stations;
            insert at least a subset of the hashes comprised in the
                obtained message authentication bundles into a
                probabilistic data structure (PDS), which forms at
                least a part of a validation filter for authenticating a
                corresponding subset of SNS messages; and
            distribute the validation filter to the at least one
                receiver-side device;
        the at least one receiver side-device is configured to:
            receive at least one SNS message sent by at least one
                satellite of the SNS;
            compute a hash for each received SNS message;
            receive a validation filter distributed by an authentica-
                tion server for authenticating a set of SNS messages,
                wherein the validation filter comprises at least a
                PDS;

query the validation filter using the hash computed for each received SNS message, comprising querying the PDS to verify if the respective hash could have been inserted into the PDS;

treat any received SNS message, whose hash cannot be verified as being used in building the validation filter, as not authenticable by the validation filter; and treat any received SNS message, whose hash can be verified as being likely to have been used in building the validation filter, as authentic with a certain probability.

16. The authentication method of claim 8, wherein the validation filter comprises at least:

the PDS, and an associated stash list populated while inserting at least a subset of the hashes of message authentication bundles obtained by the authentication server in an authentication interval.

17. The authentication method of claim 8, wherein the PDS has a fixed length for each authentication interval.

18. The authentication method of claim 8, wherein the validation filter is transmitted from the authentication server to the receiver-side device as part of an authentication message, wherein the authentication message further comprises a digital signature generated by the authentication server to ensure the authenticity of the authentication message and/or wherein the authentication message is transmitted using a secure channel ensuring the authenticity of the authentication message.

19. A device for authenticating messages of a satellite-based navigation system (SNS) the device comprising:

at least one processing unit configured to;

receive at least one SNS message sent by at least one satellite of the SNS;

compute a hash for each received SNS message;

receive a validation filter distributed by an authentication server for authenticating a set of SNS messages, wherein the validation filter comprises at least a probabilistic data structure (PDS);

query the validation filter using the hash computed for each received SNS message, comprising querying the PDS to verify if the respective hash could have been inserted into the PDS;

treat any received SNS message, whose hash cannot be verified as being used in building the validation filter, as not authenticable by the validation filter; and treat any received SNS message, whose hash can be verified as being likely to have been used in building the validation filter, as authentic with a certain probability.

\* \* \* \* \*